United States Patent [19]
Bryant et al.

[11] Patent Number: 5,943,174
[45] Date of Patent: Aug. 24, 1999

[54] NIGHT VISION MONOCULAR DEVICE

[75] Inventors: Mark Alan Bryant; Roger Douglas Whiddon; Harrison Lewis Buchanan, Jr.; Lapthe Chau Flora, all of Roanoke; John Carl Nelson, Salem, all of Va.; Bradley Todd Philippi, Bristol, Tenn.

[73] Assignee: ITT Manufacturing Enterprises, Inc., Wilmington, Del.

[21] Appl. No.: 09/098,098

[22] Filed: Jun. 16, 1998

[51] Int. Cl.⁶ .......................... G02B 23/00; G02B 13/14; H01J 31/50
[52] U.S. Cl. .......................... 359/809; 359/407; 359/409; 359/350; 359/399; 359/511; 359/512; 359/513; 359/353; 250/214 VT; 250/216; 250/215 LA
[58] Field of Search ..................... 359/350, 353, 359/399, 400, 402, 405, 407, 409, 418, 419, 511, 512, 513, 809, 811, 815, 819; 250/214, 215, 216

[56] References Cited

U.S. PATENT DOCUMENTS

| | | |
|---|---|---|
| 3,737,667 | 6/1973 | Babb et al. ..................... 250/213 R |
| 5,283,427 | 2/1994 | Phillips et al. ..................... 250/214 VT |
| 5,444,568 | 8/1995 | Williams et al. ..................... 359/400 |
| 5,595,435 | 1/1997 | Palmer et al. ..................... 362/109 |
| 5,604,630 | 2/1997 | Palmer ..................... 359/409 |
| 5,644,425 | 7/1997 | Palmer ..................... 359/409 |
| 5,737,131 | 4/1998 | Palmer ..................... 359/819 |
| 5,796,516 | 8/1998 | Palmer ..................... 359/399 |
| 5,867,313 | 2/1999 | Schweitzer et al. ..................... 359/418 |

Primary Examiner—Georgia Epps
Assistant Examiner—David N. Spector
Attorney, Agent, or Firm—Arthur L. Plevy

[57] ABSTRACT

A monocular night vision device comprising an objective lens assembly for receiving low intensity light; an image intensifier assembly comprising a variable gain image intensifier tube having an adjustable potentiometer mounted external to the tube for converting the low intensity light into a visible output image; a single eyepiece lens assembly for viewing the output image from the image intensifier assembly; and a non-metallic housing for receiving the objective lens assembly, image intensifier assembly, and eyepiece lens assembly, wherein the housing aligns the objective lens assembly with the image intensifier assembly and the eyepiece lens assembly along an optical axis.

20 Claims, 12 Drawing Sheets

NIGHT VISION MONOCULAR DEVICE

RELATED APPLICATIONS

This application is related to co-pending commonly assigned applications Ser. No. 09/074,796 entitled LIGHT TRANSMITTING DEVICE and application Ser. No. 09/123,371 entitled VARIABLE GAIN IMAGE INTENSIFIER assigned to ITT Corporation, the assignee herein.

FIELD OF THE INVENTION

This invention relates generally to electronic devices and, more particularly, to a monocular night vision device for improved night vision operation.

BACKGROUND OF THE INVENTION

A monocular night vision system basically incorporates a single eyepiece lens assembly, image intensifier assembly, and objective lens assembly. Most monocular night vision devices (MNVDS) are compact and lightweight to optimize hand-held use. MNVDS are often referred to as pocket scopes since they could optimally be small enough to be stored in a user's pockets.

Numerous MNVDS exist in the prior art. Examples of some of these night vision devices, including hand-held night vision devices, include U.S. Pat. No. 5,737,131 entitled NIGHT VISION MONOCULARS, issued Apr. 7, 1998 and U.S. Pat. No. 5,644,425, issued Jul. 1, 1997, entitled NIGHT VISION MONOCULAR WITH UNISTRUCTURAL OPTICAL BED also teaches a hand-held night vision device for use in both military and non-military applications, however these devices generally suffer from a combination of poor performance characteristics and design shortcomings which lead to inefficient device operation or limited flexibility, and poor performance. For example, a number of the monocular night vision devices have main housings which are made of metallic material which make them rugged, but heavy. Moreover, prior art MNVDs are often bulky and uncomfortable to hold in one's hand and are difficult to operate when deployed in completely dark areas. Furthermore, prior art MNVDS are often energy efficient, expending battery power even when not in use, such as during daylight. In the event of a headmounted device, prior art MNVDS did not automatically turn off when removed from the helmet mount or when flipped up in the helmet mount. Still further, prior art devices could not be mounted to an M16/M4 receiver rail as configured for the Modular Weapon System Kit (which fits the mounting rail defined in MIL-STD-93), and standard AN/PVS-7 accessories such as the lens cap, sacrificial filter, compass, 3× magnifier, and light interference filter could not be attached to the objective lens assembly of these devices.

Accordingly, a monocular night vision device which provides such features and which is lightweight and optimized for ease of manufacturing assembly is greatly desired.

SUMMARY OF THE INVENTION

It is an object of the present invention to provide a monocular night vision device having a main housing comprising a plastic material to provide a lightweight system and which is ergonomically structured for optimal hand-held use. The device includes a forward-projecting infrared light-emitting diode (IRLED) for illumination in completely dark areas and a photo transistor operable to turn off the device during daylight. The device further includes a head/helmet mount adapter for mounting the device to a standard AN/PVS-7 headmount or helmet mount. Contacts in the MNVD electrically couple to the head/helmet mount adapter and are operable for turning off the system when the device is removed from the head/helmet mount or when flipped-up in the helmet mount. The MNVD also includes a low-battery sensor circuit and indicator, as well as a small arms mounting adapter for mounting to a receiver rail of a weapon such as the M16 or M4. The device further includes a user adjustable image intensifier variable gain capability allowing the user to vary the gain of the image intensifier. The MNVD incorporates the standard AN/PVS-7 objective focus knob and external cell threads for accommodating the standard AN/PVS-7 system accessories.

DETAILED DESCRIPTION OF THE INVENTION

Figure 1:
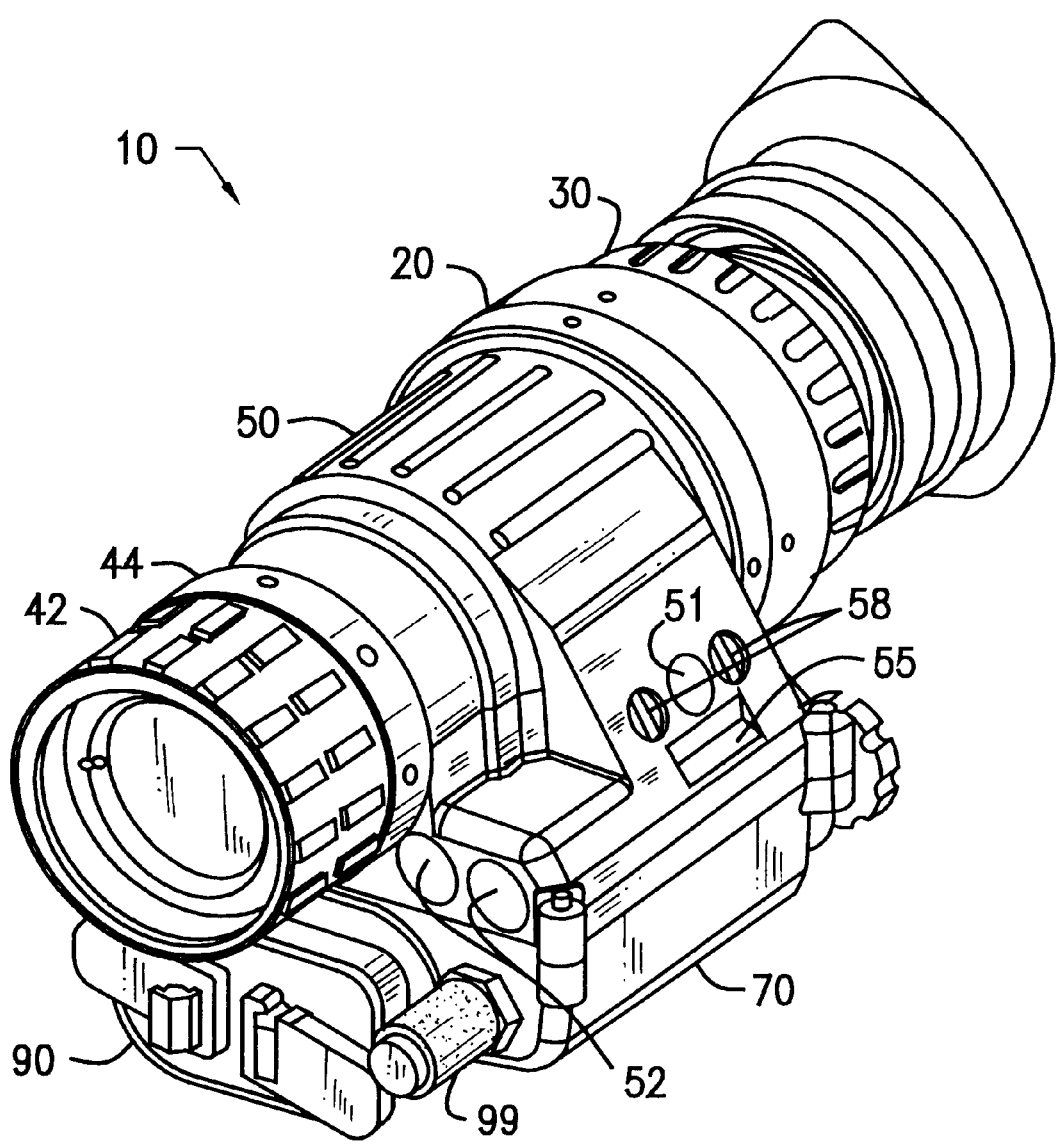
FIG. 1 is a perspective view of the MNVD according to the present invention.
Figure 2:
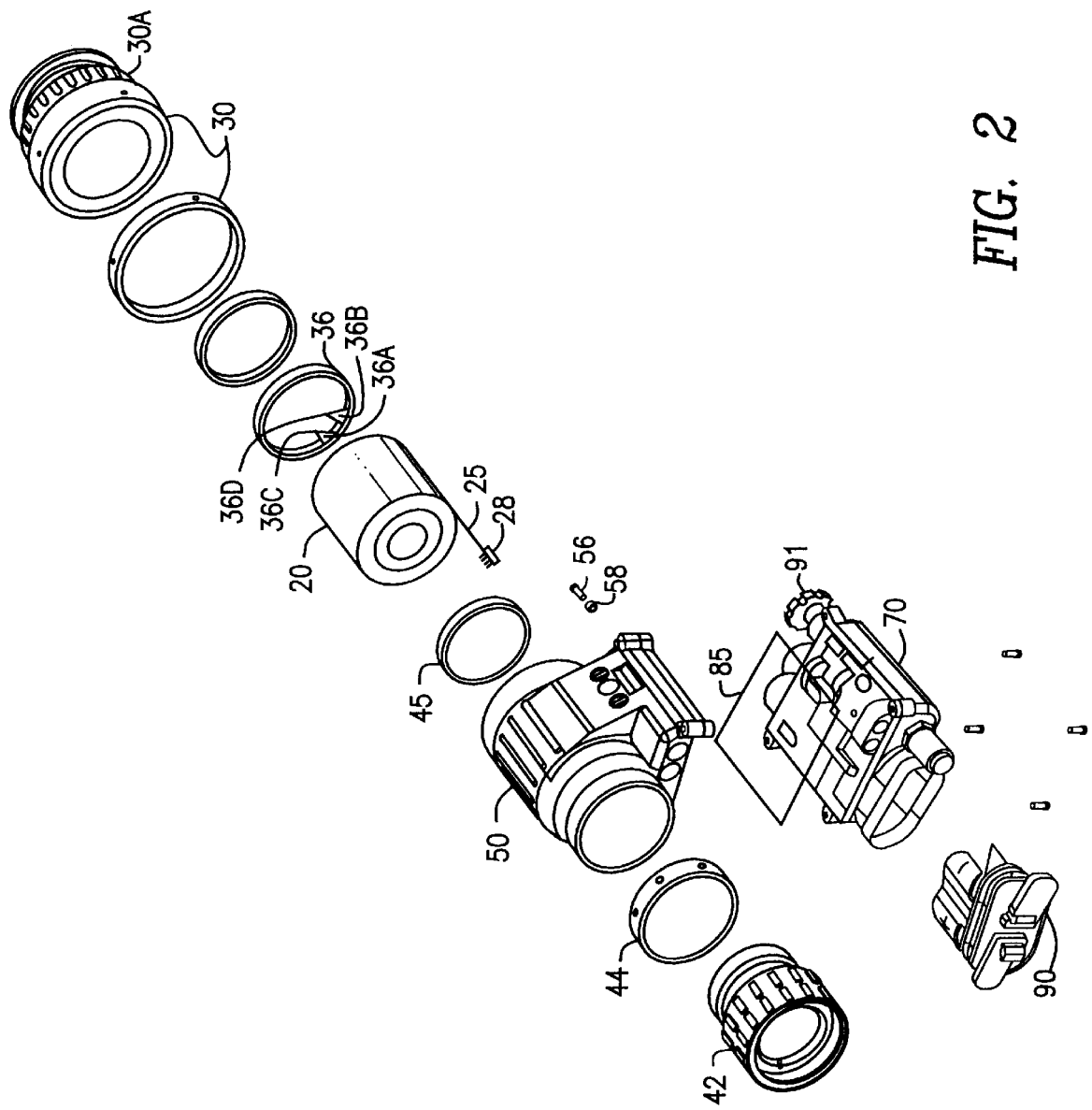
FIG. 2 is an exploded view of the MNVD of FIG. 1.

A monocular night vision device 10 according to the present invention is shown in FIG. 1, incorporating numerous enhancements over previously designed systems. This device 10 is compact, lightweight, and comfortably fits into a user's hand. The device can be hand held, head or helmet mounted, or mounted onto a weapon such as a rifle. These capabilities provide a versatile monocular night vision device with a wide variety of usage modes. FIG. 2 provides an exploded view of the elements comprising the MNVD 10 of FIG. 1. Note that, when referring to the drawings, like reference numerals are used to indicate like parts.

Figure 3:
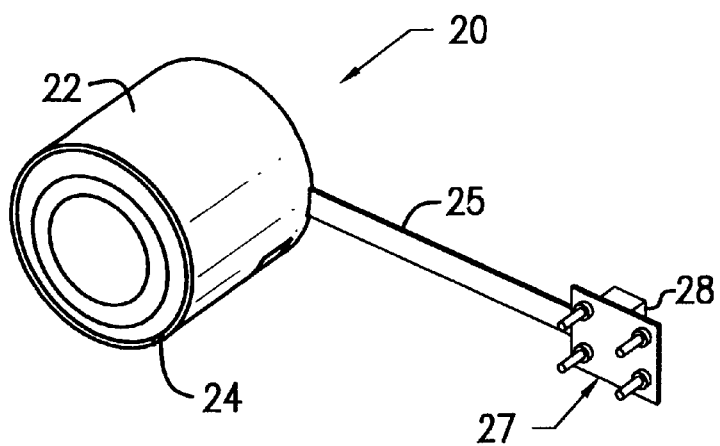
FIG. 3 is an illustration of the variable gain image intensifier incorporated into the MNVD of the present invention.

Referring now to FIGS. 2 and 3, the MNVD 10 includes an image intensifier 20 (see FIG. 3) which has the same performance as the conventional MX-10160 intensifier, but provides the capability for the tube gain to be varied by the user. This is accomplished through an externally mounted adjustable potentiometer 28. The image intensifier 20 includes a flex circuit 25 with a four pin connector 27 positioned external to the cylindrical body 22 to provide power to the intensifier tube. A tube alignment pin 60 ensures proper alignment of the image intensifier tube with the upper housing.

External Gain Control knob 99 extending from the front 85 of the lower housing allows a user to variably adjust the gain of the image intensifier tube 20 to the desired level for optimal performance. A conventional eyepiece lens assembly 30, such as the AN/AVS-6 eyepiece lens, is incorporated into the monocular night vision device 10. This eyepiece provides 25-mm eye relief which is optimal for use in weapon firing or with NBC (nuclear/biological/chemical) gear. An eyepiece adapter 30A is attached to the rear of the eyepiece which allows for fastening an eyecup or eye guard and a demist shield 41 (FIG. 4B).

The monocular night vision device 10 further incorporates an objective cell assembly 40 comprising an objective lens assembly 42 and infinity focus stop ring 44, having the same optics as a conventional AN/AVS-6 objective cell assembly. This allows for high optical performance of the device since distortion is minimized between the standard AN/AVS-6 eyepiece and objective optics. However, the optics of device 10 are packaged into a lens cell housing having the same external features and dimensions as the AN/PVS-7 lens cell housing. This allows for identical focus adjustment as the AN/PVS-7 and incorporation of the standard AN/PVS-7 objective focus knob and external cell threads for accepting standard AN/PVS-7 accessories. A close focus stop ring 45 is fastened to the rear side of the objective cell lens assembly.

Figure 4A:
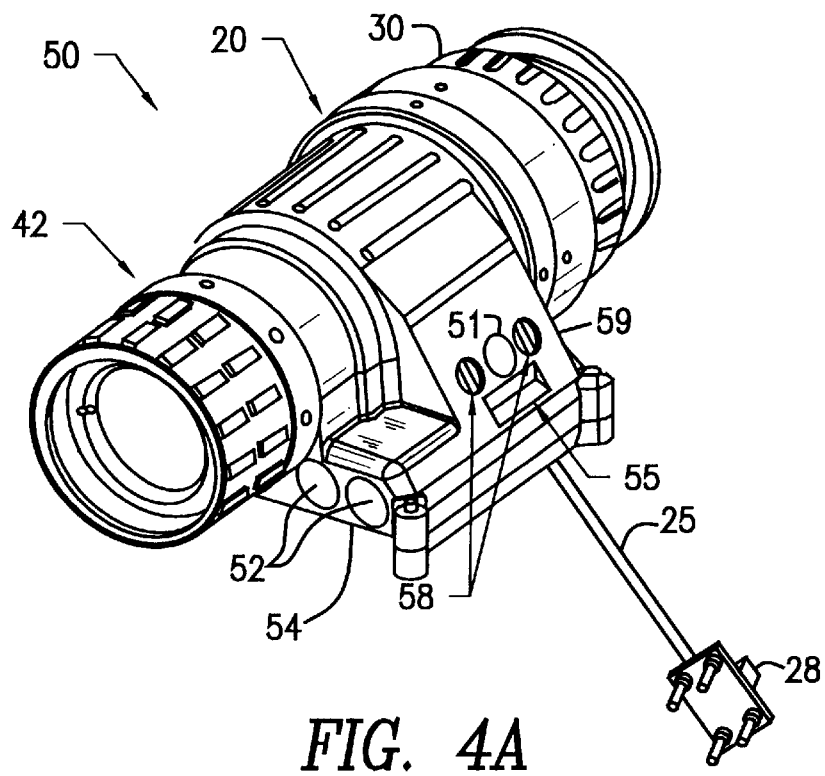
FIGS. 4A and 4B are top and bottom perspective views of the upper housing assembly.
Figure 4B:
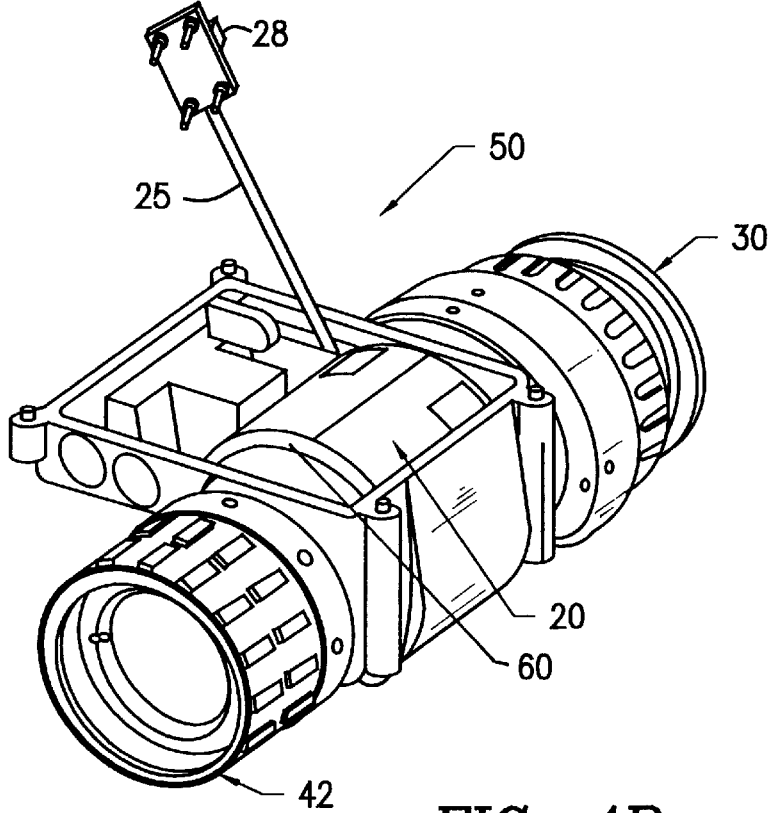
Figure 5B:
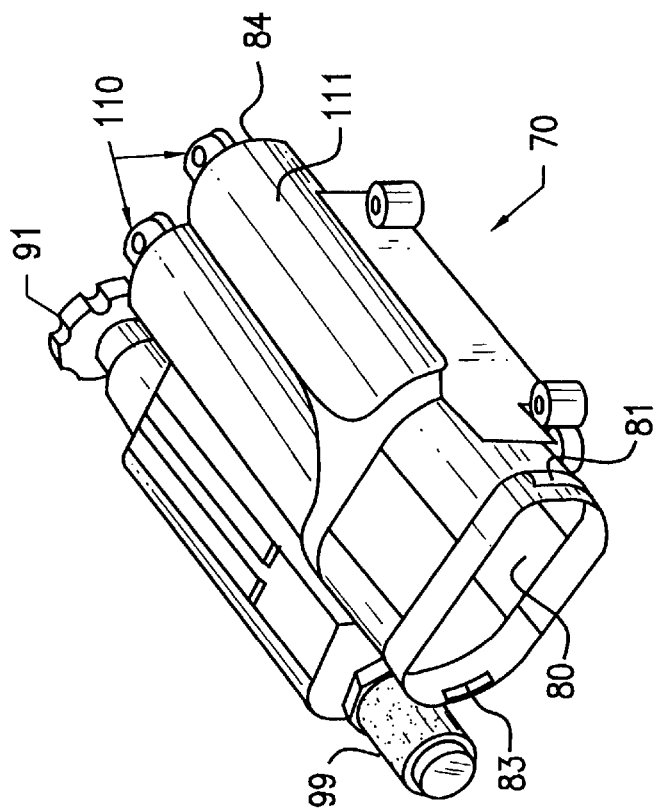
FIGS. 5A and 5B are top and bottom perspective views of the lower housing assembly.
Figure 5A:
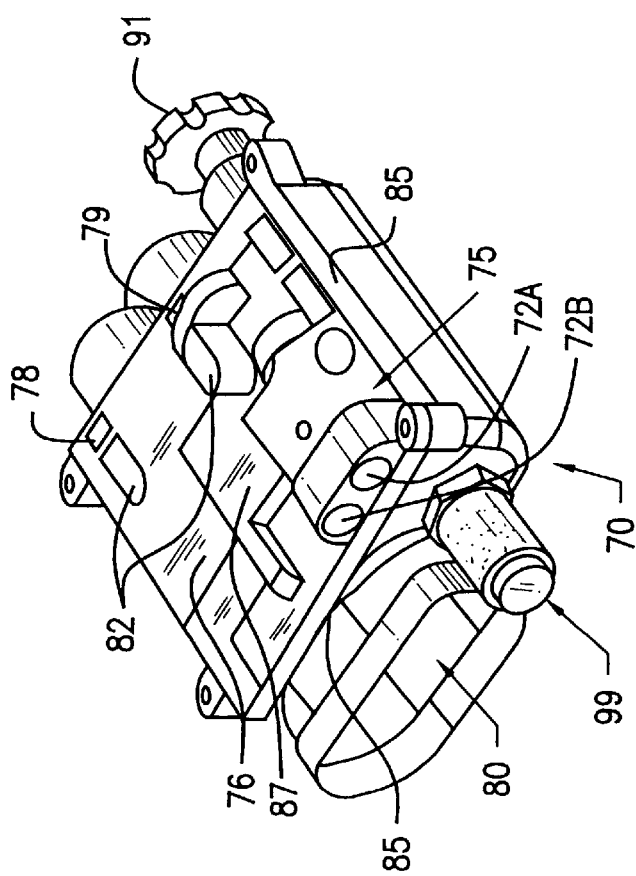

As best shown in FIGS. 2,4, and 5, the main body of the monocular night vision device 10 consists of an upper housing 50 and lower housing 70. The upper and lower housing are separated along the optical axis of the system, such that upon assembly, the housings are coupled along said axis. The upper housing 50, as shown in FIGS. 4A–B, holds the objective lens assembly 42, image intensifier 20, and eyepiece lens assembly 30. The lower housing, as illustrated in FIGS. 5A–B, holds the electronics 76 and the battery cavity 80. This design of a split upper and lower housing provides for ease of assembly and maintainability. As shown in FIG. 2, an o-ring 85 fits onto and engages oppositely disposed surfaces of the upper 50 and lower 70 housings to provide an environmental seal between the upper and lower housings.

Referring again to FIG. 4A, two clear circular windows 52 are positioned on the front face 54 of the upper housing 50. These windows align with an IRLED 72A and phototransistor 72B when assembled to the lower housing (FIG. 5A). The IRLED 72A is activated by OFF/SYSTEM ON/MOMENTARY IR ON/LOCKED IR ON switch 91 via the electronics to provide forward projecting light for additional illumination. This is particularly useful for operations conducted in virtually total darkness. Phototransistor 72B is operable to sense light intensity incident onto its window indicative of daylight or sunlight, and in response to sensing an amount of light intensity exceeding a predetermined threshold, operates via the electronics in the lower housing to turn off the night vision device 10, thus protecting the image tube from burn-in. More particularly, phototransistor 72B provides a signal indicative of the amount of sunlight detected at the phototransistor to a sensor circuit on electronic control board 76. The sensor circuit than compares the received signal with a predetermined threshold value. If the signal exceeds the threshold value, the intensifier tube is turned off, thereby protecting the image tube and extending the life of the device.

An environmentally sealed purge screw 56 and o-ring 58 (FIG. 2) is located on the rear face 59 of the upper housing 50 which has a cavity (not shown) into which the screw is inserted. The purge screw permits the monocular night vision device 10 to be environmentally purged after assembly of the system is complete. This is done, for example, in order to compensate for differences in atmospheric conditions between device field operation and the manufacturing facility.

As best shown in FIG. 2, the upper housing assembly optically aligns a light transmitting ring 36 between the image intensifier 20 and eyepiece lens assembly 30 for transmitting light from LEDs 78 and 79 on lower housing 70 outside the user's optical field of view. Light transmitting ring 36 in the preferred embodiment, is cylindrical shaped and made of a clear material such as acrylic to permit light from remote visible indicators (LEDs)78 and 79 at the lower housing assembly 70 to be transmitted to the peripheral field of view of the user. Flats 36A and 36B on the outside diameter of the light transmitting ring accept light from respective LEDs 78, 79 and transmit the light to flats 36C and 36D respectively on the inside diameter. The transmitted light is thereby transmitted along the optical path and thus appears in the user's field of view, thereby providing a signal to the user. The ring is positioned as illustrated in FIG. 2 and oriented with respect to the lower housing assembly 70 such that flats 36A and 36B are vertically aligned with respective LED indicators 78 and 79. In this manner, the LED indicators might be housed within the compact lower housing assembly and out of the direct field of view of the user, while still permitting the light emitted from the respective indicators to be received and viewed at the eyepiece. An alignment tab on the light transmitting ring ensures proper alignment with the upper housing.

Referring to FIG. 5A, the lower housing assembly, as previously discussed, includes a printed circuit board (PCB) assembly 76 fastened directly thereto. Several interfacing electrical components are located on the upper side of the rigid PCB. A plastic housing 74 is located on the PCB which holds conventional IRLED 72A and phototransistor 72B. Also on the PCB are conventional AN/AVS-6 tube contacts 82 which provide electrical connection to the image intensifier. Two LEDs 78, 79 on the PCB provide indication of low battery power and activation of the IRLED, respectively. A low battery sensor circuit 108 of the conventional type is included within the electronics on lower housing 70 for periodically measuring the power output from the batteries and comparing the measured power with a predetermined threshold. When the measured battery power drops below the predetermined threshold, the battery sensor circuit is operable to activate LED 78 to provide a signal indicative of the low battery condition. The signal is transmitted into the user's field of view via the light-transmitting ring 36 from low battery power LED 78. Note also that the PCB incorporates a four socket connector 75 for tube variable gain which aligns with and accepts the four pin connector from the image intensifier.

Lower housing 70 further comprises a battery cavity 80 designed to hold batteries and oriented in-line with the optical axis. The opening for the battery cavity is integral with the front face 85 and provides a monocular night vision device that is comfortable to hold in the hand. Preferably the battery cavity holds two AA batteries. Use of two AA batteries provides both a worldwide common battery, as well as extending battery life under severe cold conditions.

Figure 6:
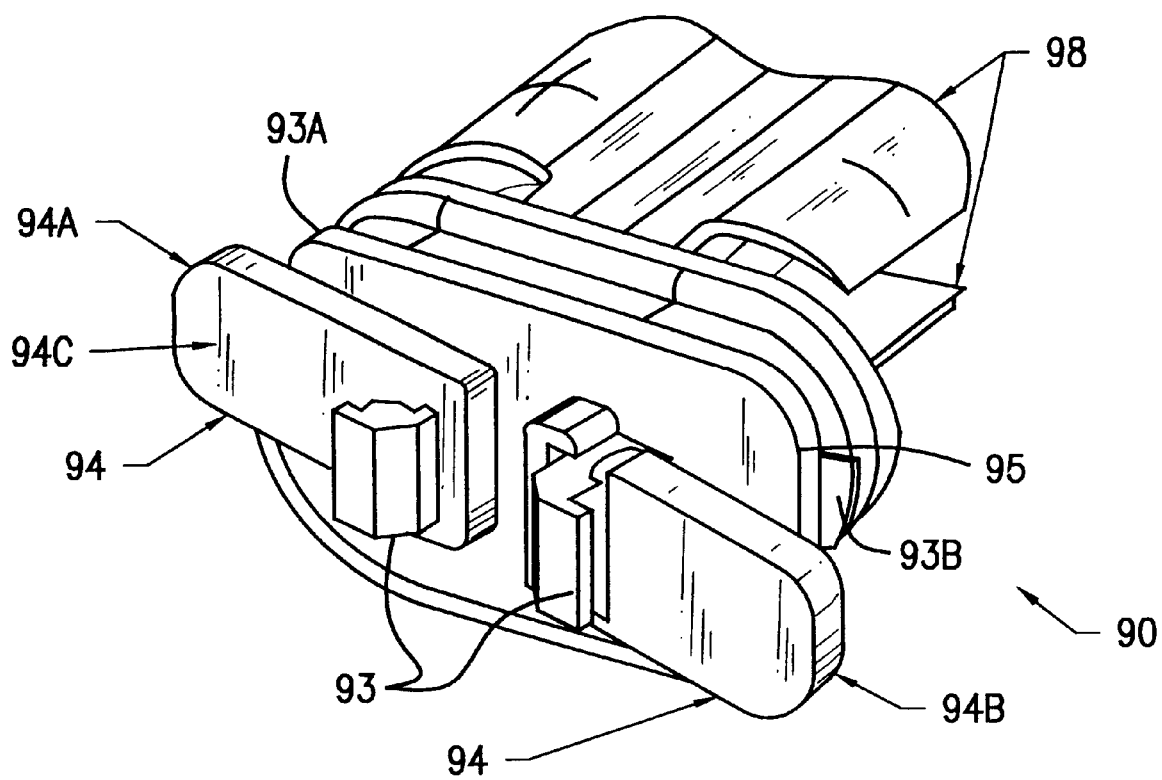
FIG. 6 is a perspective view of the battery cartridge of the present invention.

Referring now to FIG. 6, battery cartridge 90 provides the capability to preload batteries before insertion into the battery cavity 80. In the preferred embodiment, the battery cartridge 90 is inserted into battery cavity 80 by pressing down onto the external surface or levers 94 of the battery cartridge. Such insertion method is fast and simple compared to screwing a battery cap on. Battery holders 98 are oppositely disposed on an external surface of cartridge 90 and contoured to flexibly accommodate two AA size batteries. Positive and negative polarities are indicated on the outer surface of the battery holders to aid the user in properly inserting the batteries. The battery cartridge 90 is removed by depressing levers 94 from the outside surfaces 94A, 94B to provide an inward, horizontal force. Levers 94 are each coupled to latches 93 which engage and move inward in response to horizontal forces applied at 94A and 94B. Latching mechanism 93 further includes horizontal projections 93A and 93B extending beyond the periphery 95 of the battery cartridge cover such that when no force is applied, these projections extend beyond the periphery. However, in response to the inward depression of latches 94A and 94B, latches 93 are urged toward one another causing protruding portions 93A and 93B to retract from beyond peripheral portion 95. In this manner, battery cartridge 90 may be both inserted and removed easily from battery cavity 80. Note that, as best seen in FIG. 5B, projections 93A and 93B of the battery cartridge slidingly engage slots 81 and 83 respectively, positioned on the peripheral edge of cavity 80. In this manner, when the battery cartridge 90 is inserted into battery cavity 80, extensions 93A and 93B respectively engage slots 83 and 81 and extend therethrough to secure the cartridge to the device. Upon removal, depression of the levers 94 inwardly causes retraction of extensions 93A and B from the slots 81 and 83 so that the battery cartridge is ejected from the cavity. Note further that, projections 93A and 93B have inwardly beveled surfaces which permit these extensions to slide over and engage their respective slots in response to a force 94C applied to the surface of the levers, rather than requiring one to inwardly depress the levers. If the battery cartridge 90 is not tethered to the monocular night vision device 10, the user may quickly remove a non-operating battery cartridge and replace it with a second battery cartridge with new batteries preloaded. This provides extremely fast battery replacement. However, the battery cartridge may be tethered to the MNVD to avoid accidental loss.

Figure 13:
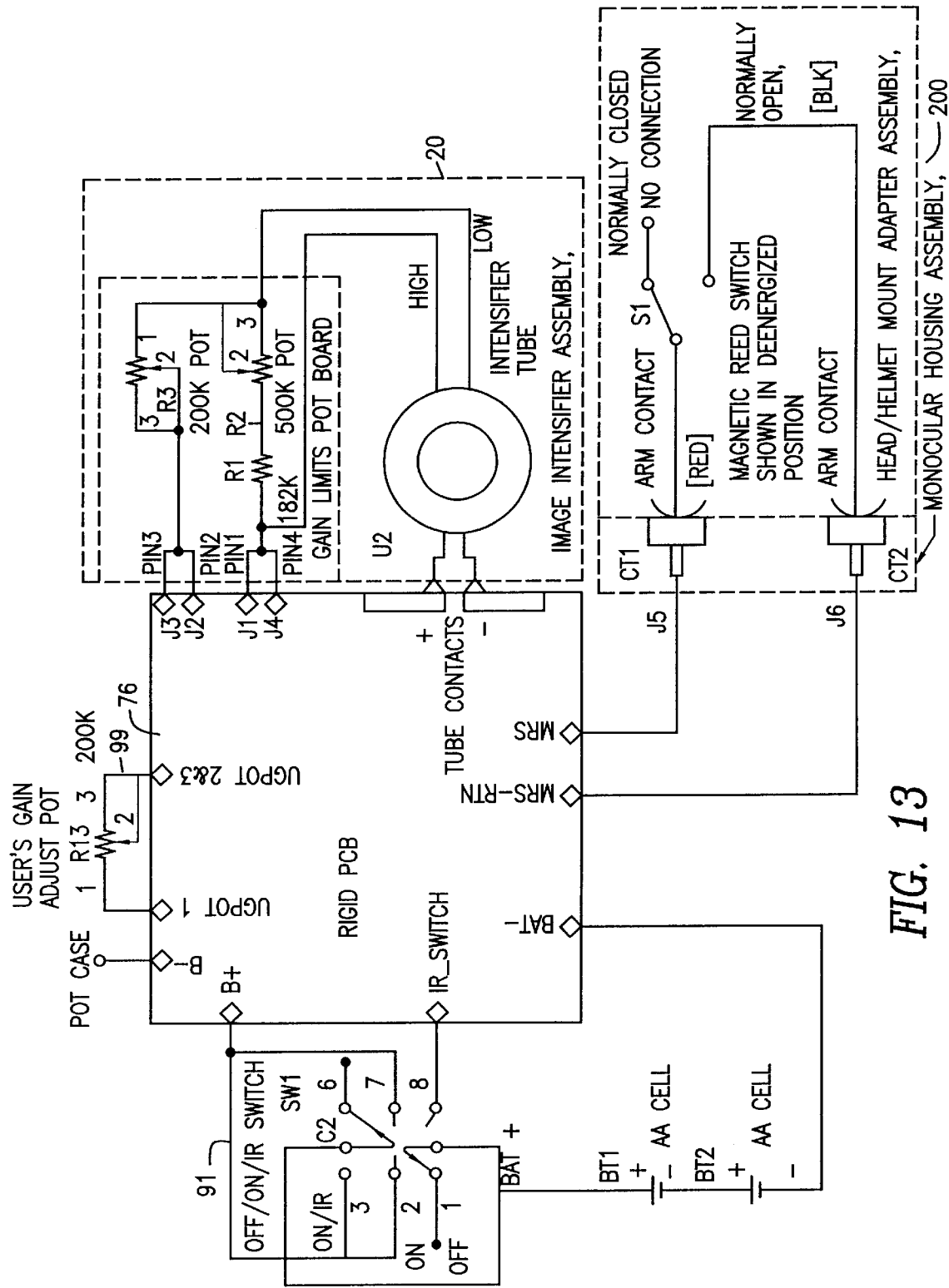
FIG. 13 is a schematic illustration of terminal connections associated with the electronic circuit board of the lower housing of the MNVD according to the present invention.

The lower housing 70 further contains a flex circuit assembly 87 which provides for electrical contact between system components. This flex circuit assembly 87 electrically connects standard rotary switch 91 as employed in the AN/PVS-7 system with the battery power supply. This switch provides the following controls: OFF/SYSTEM ON/MOMENTARY IR ON/LOCKED IR ON. The SYSTEM ON mode is reached by turning clockwise from the OFF position. When the switch is positioned to SYSTEM ON mode, the tube is operational; however, the IR capability is non-functional in this mode. The switch is spring loaded such that turning of the switch knob 91 in the clockwise direction for SYSTEM ON mode activates the MOMENTARY IR ON mode to permit IR signaling. In this manner, one may use the MOMENTARY IR ON mode to send Morse Code or other such signaling in a covert manner. Locked IR ON mode provides continuous IR feature and is enabled by pulling the switch knob towards the user and turning in a clockwise manner to allow engagement of this mode. Note that the switch is electrically coupled to potentiometer 27 (FIG. 3) for user adjustment of the image intensifier's gain level. Two female pin connectors are also part of the flex circuit assembly. These connectors are attached to the two contacts 82 in the upper housing assembly when the upper and lower housings are assembled. FIG. 13 provides a circuit schematic of the electronics in the lower housing including the PCB and contact points/terminals.

Figure 7:
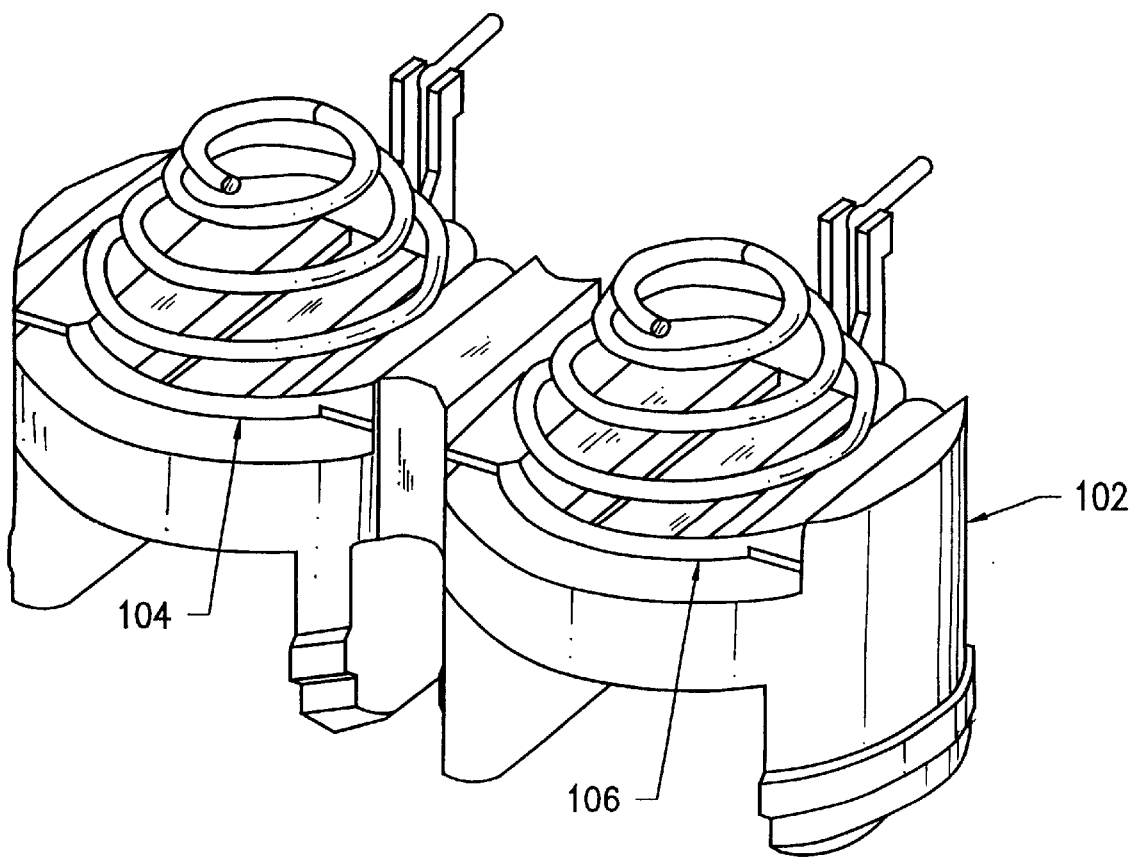
FIG. 7 is an illustration of the battery spring assembly.

FIG. 7 shows a battery spring assembly 100 comprising a spring holder 102 and two conical springs 104, 106. The battery spring assembly 100 is located at the bottom or base of battery cavity 80 and provides springable electrical contacts for the batteries. Electrical connectivity is communicated via the extension wires 103 to the flex circuit assembly on the lower housing for providing power to the device. Because the assembly consists of only three parts, the piece part count and assembly process is greatly simplified. Note that the battery cartridge 90 is assembled to the lower housing 70 by simply orienting the cartridge with the lower housing and pushing the cartridge 90 into the battery cavity 80 until extensions 93A and 93B (FIG. 6) engage slots 81 and 83 (FIG. 5B). In this configuration, the conical springs provide electrical connectivity and physical resistance to the batteries to cause the battery cartridge to springably eject from the housing upon depression of the levers.

As shown in FIG. 5B, two lanyard loops 110 integrally extend from the rear 84 of the lower housing 70 to provide fastening points for a lanyard. The size and dimension of the lanyard loops allow for a standard lanyard (neck cord) such as used in the AN/PVS-7 monocular device to be threaded through and fastened.

FIG. 4A further shows a mounting socket 51 on the outer surface 53 of upper housing assembly 50 for mounting to an apparatus such as a head/helmet mount adapter or small arms mounting adapter. Preferably, mounting socket 51 is a ¼" threaded insert. Proximal to the mounting socket, and preferably directly below, on surface 53, is a triangular alignment feature 55 which aids in both aligning and orienting the head/helmet mount adapter or small arms mounting adapter. Two contacts 58 positioned adjacent to the mounting socket provide electrical contact between the monocular night vision device 10 and the head/helmet mount adapter.

Figure 8A:
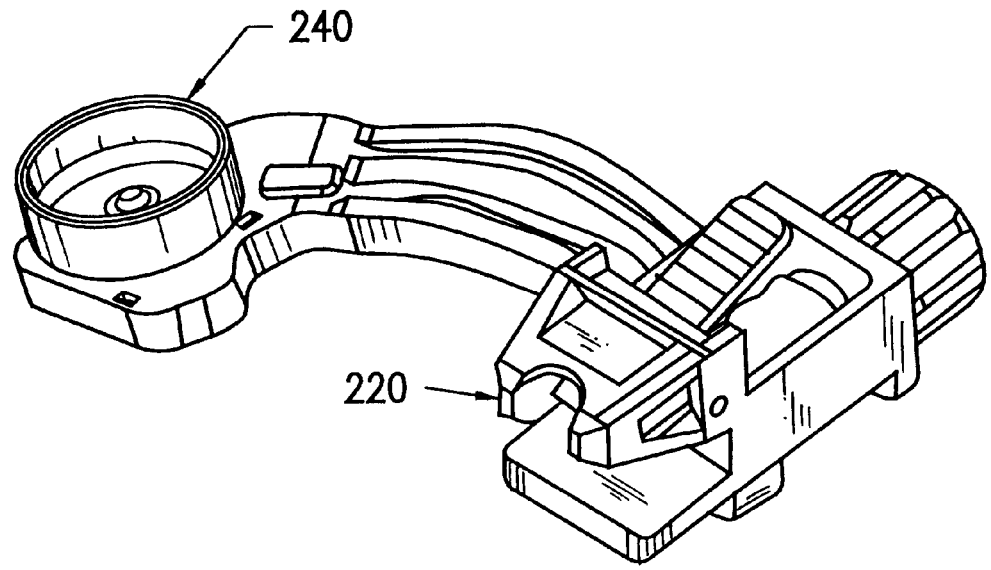
FIGS. 8A and 8B are top and bottom isometric views of the head/helmet mount adapter of the MNVD system.
Figure 8B:
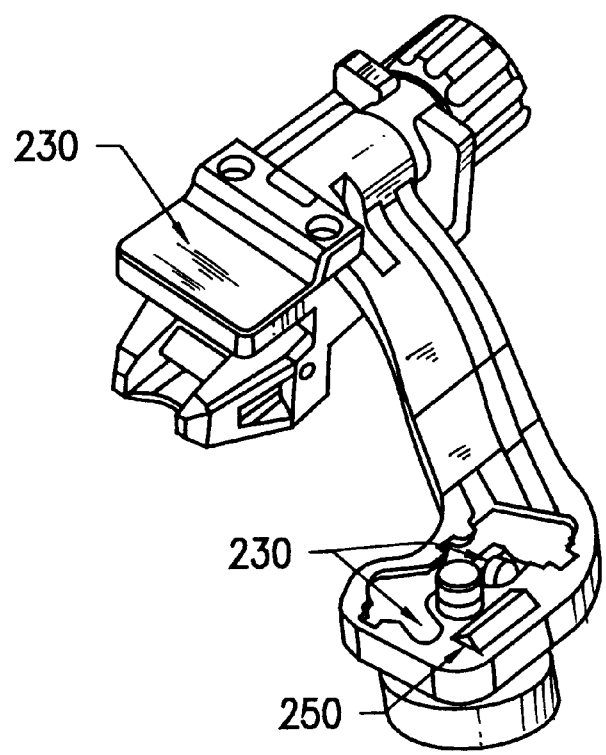
Figure 9:
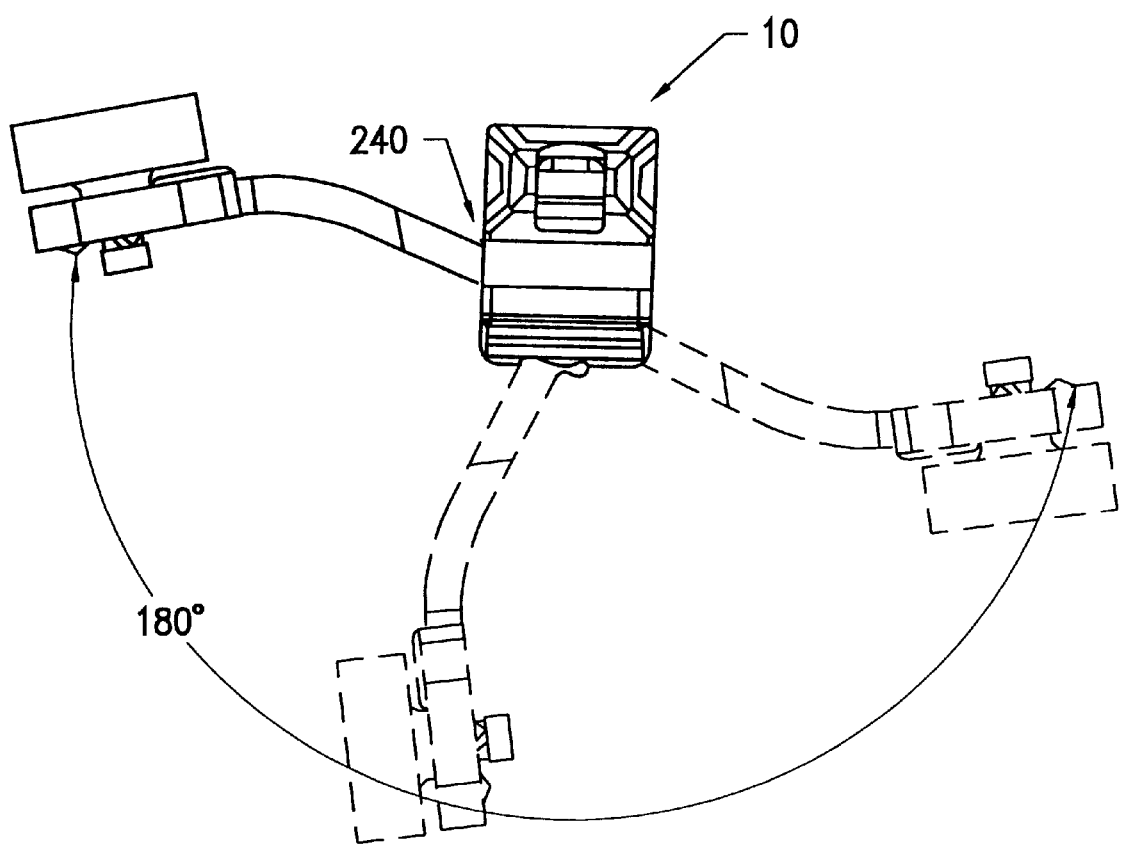
FIG. 9 is an illustration of the rotational movement of the MNVD head/helmet mount adapter.
Figure 10:
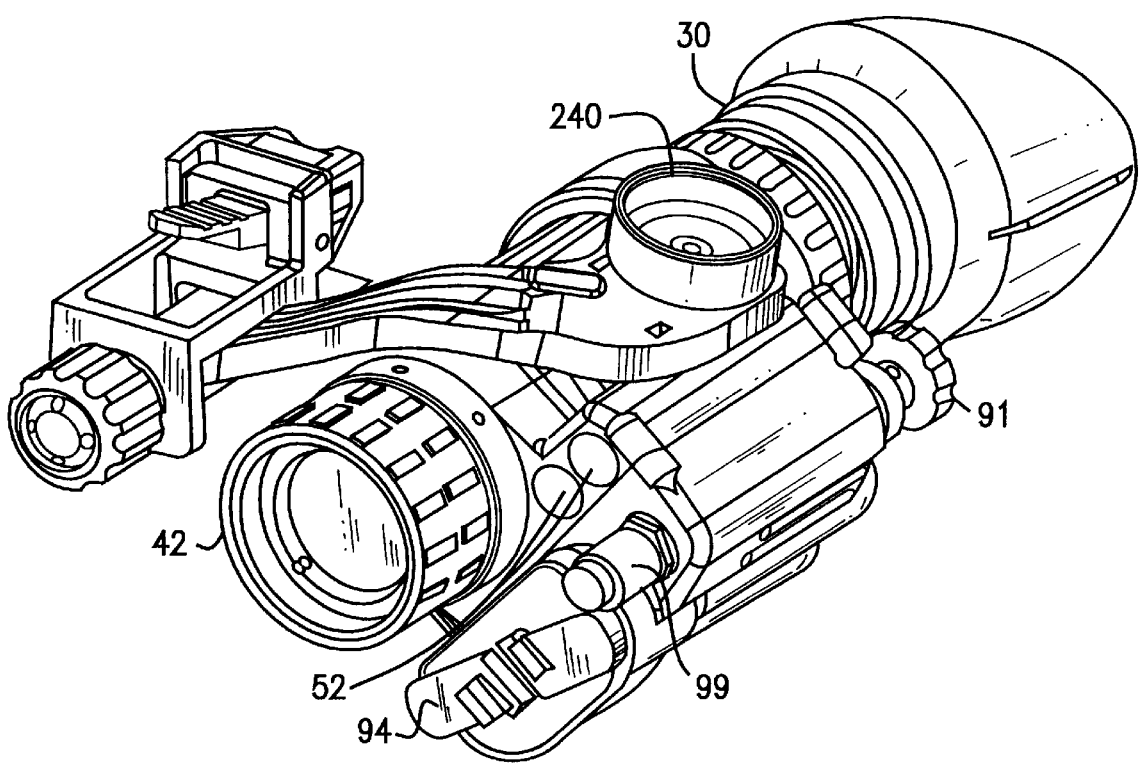
FIG. 10 is an illustration of the head/helmet mount adapter fastened to the MNVD of the present invention.

FIGS. 8A–B illustrate a head/helmet mount adapter 200 for coupling to the monocular night vision device 10. This adapter allows the monocular night vision device to be mounted to a standard AN/PVS-7 head mount or helmet mount. An adjustable mounting arm 210, which can be rotated 180 degrees (see FIG. 9) allows the monocular night vision device to be positioned in front of either the left or right eye as shown in FIG. 10. This adapter incorporates a mounting horn 220 and mounting latch 228. A reed switch 230 positioned beneath mounting horn 220 operates to turn off the monocular night vision device when removed from the headmount or helmet mount or when flipped-up in the helmet mount. A cable assembly runs from the reed switch 230 down the mounting arm 210 and to a set of contacts 232 at the opposite end of the mounting arm. These two contacts align with the contacts 58 on the upper monocular housing surface 53 when the adapter is fastened to the monocular's upper housing. Preferably, a captivated 0.25" thumbscrew allows for fastening the adapter 200 to the monocular night vision device at mounting socket 51. The triangular alignment feature 250 located near the thumbscrew aids in orienting the monocular night vision device to the adapter.

Figure 11:
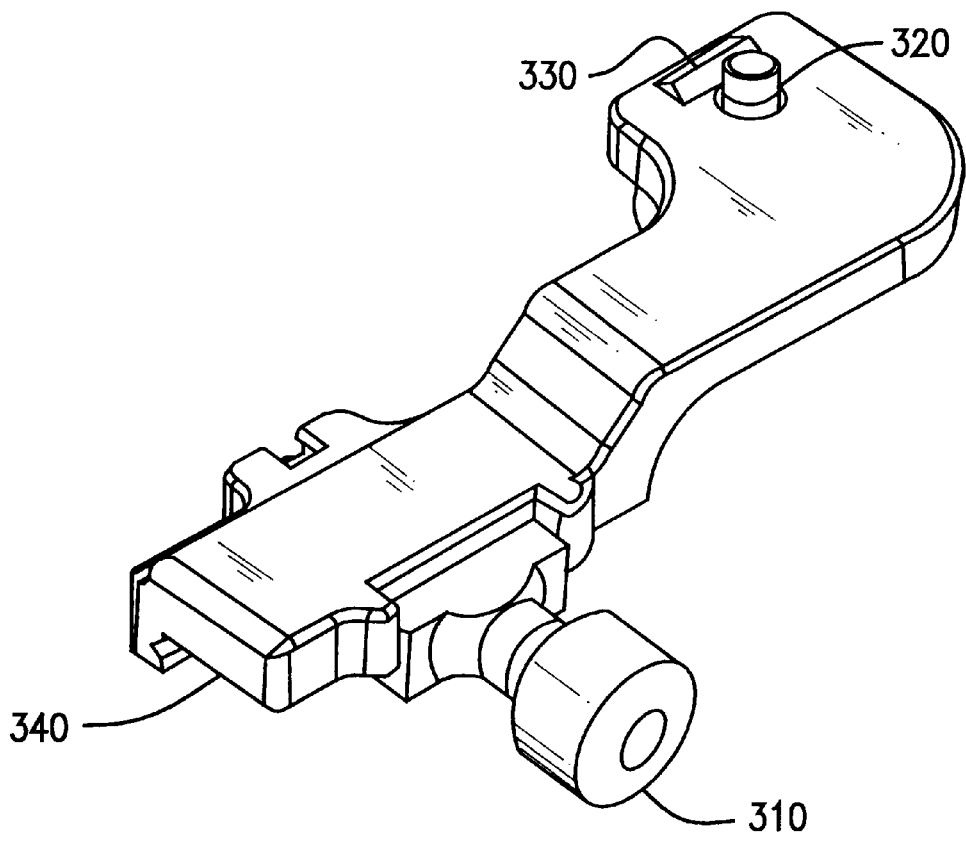
FIG. 11 is an illustration of a small arms mounting adapter for attaching to the MNVD.
Figure 12:
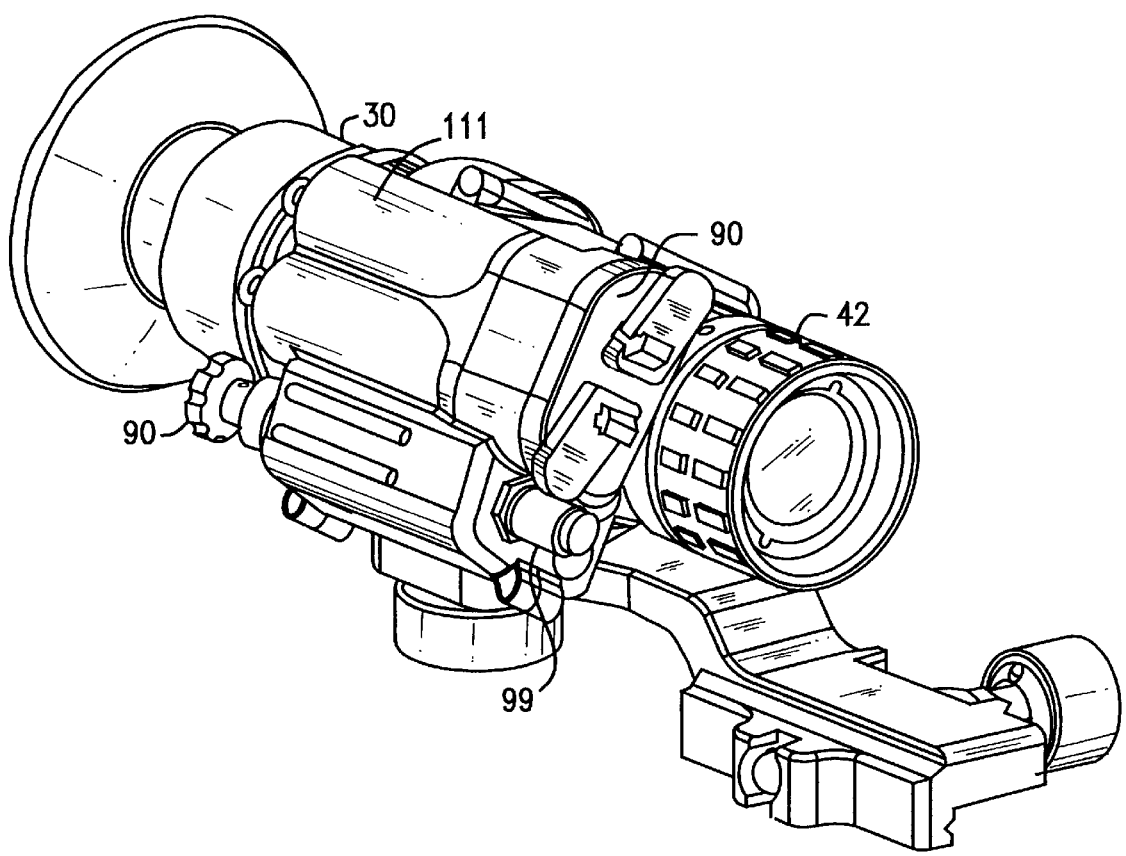
FIG. 12 is a perspective view of the small arms adapter of FIG. 11 connected to the MNVD.

FIGS. 11 and 12 show a small arms mounting adapter 300, incorporated as part of the monocular night vision device 10. This adapter allows for mounting to an M16/M4 receiver rail 340 as configured for the Modular Weapon System Kit and as defined in MIL-STD-1913. The adapter positions the monocular night vision device optimally on the weapon so that the user does not have to change their normal shooting position. The adapter incorporates a torque limiting mechanism in the fastening knob assembly 310 that fastens the adapter to the mounting rail while preventing a user from over-tightening the fastening knob assembly. Preferably, a captivated 0.25" thumbscrew 320 allows for fastening the adapter to the monocular night vision device at mounting socket 51. Triangular alignment feature 330 located proximal the thumbscrew 320 aids in orienting the monocular night vision device to the adapter and also helps to keep the monocular night vision device properly oriented during weapon firing.

It should be understood that a person skilled in the art may make many variations and modifications to embodiments utilizing functionally equivalent elements to those described herein. Any and all such variations or modifications, as well as others which may become apparent to those skilled in the art, are intended to be included within the scope of the invention as defined by the appended claims.

We claim:

1. A monocular night vision device comprising:
   an objective lens assembly for receiving low intensity light;
   an image intensifier assembly comprising a variable gain image intensifier tube having an adjustable potentiometer mounted external to said tube for converting the low intensity light into a visible output image;
   a single eyepiece lens assembly for viewing said output image from said image intensifier assembly; and
   a non-metallic housing for receiving the objective lens assembly, image intensifier assembly, and eyepiece lens assembly, wherein said housing aligns said objective lens assembly with said image intensifier assembly and said eyepiece lens assembly along an optical axis.

2. The device according to claim 1, wherein said non-metallic housing comprises:
   an upper housing for receiving said objective, lens, and image intensifier assemblies; and
   a lower housing containing an electronic circuit board and a battery cavity for receiving at least one battery, wherein said upper and lower housing are coupled to one another along said optical axis.

3. The device according to claim 2, further comprising an infrared illumination device coupled to the front of said lower housing via said electronic circuit board for providing forward projection illumination.

4. The device according to claim 3, further comprising a photo-detection means located on said lower housing for detecting natural illumination and turning off said intensifier tube in response to said natural illumination exceeding a predetermined threshold.

5. The device according to claim 4, further comprising battery sensor means responsive to said at least one battery for detecting when the power associated with said battery drops below a predetermined threshold and providing a signal to the user indicative of said condition.

6. The device according to claim 5, wherein said battery sensor means includes a first light emitting indicator disposed on said electronic circuit board at the rear of said lower housing and operable to illuminate in response to said battery having a power less than said threshold value.

7. The device according to claim 6, further including a second light emitting indicator coupled to said circuit board and adjacent to said first light emitting indicator for providing visible indication to said user that said infrared illumination device is activated.

8. The device according to claim 1, wherein said non-metallic housing is made of plastic.

9. The device according to claim 7, further comprising mounting means coupled to said upper housing for attaching to a peripheral unit, said peripheral unit selected from the group consisting of a user's head, helmet, or weapon.

10. The device according to claim 9, wherein said first and second light emitting indicators are located outside the optical field of view, said device further comprising light transmitting means responsive to said first and second light emitting indicators for transmitting light associated with said indicators into the optical field of view of said user.

11. The device according to claim 10, wherein said light transmitting means comprises a light transmitting ring coupled between said image intensifier tube and said eyepiece lens assembly on said upper housing, said light transmitting ring having first and second inwardly extending projections for receiving light illuminated from said first and second light emitting indicators disposed beneath said respective projections and transmitting said light into said user's field of view.

12. The device according to claim 9, wherein said mounting means comprises a mounting socket for receiving said peripheral unit, and contacts positioned adjacent said mounting socket for providing electrical connection between said peripheral unit and said device.

13. The device according to claim 12, further comprising a flexible circuit assembly for providing electrical contact between said circuit board and said at least one battery, said flex circuit assembly including a rotary switch coupled to said circuit board via said flex circuit for providing ON, OFF, and INFRA RED (IR) modes of operation.

14. The device according to claim 13, wherein said contacts on said upper housing provide electrical contact between the device and the peripheral unit such that said device will automatically turn off when said contacts are disengaged from said peripheral unit.

15. The device according to claim 14, further comprising a battery cartridge containing said at least one battery detachably inserted into said battery cavity.

16. The device according to claim 15, wherein said image intensifier assembly further includes a flexible circuit and four pin connection for electrically coupling said image intensifier tube to said circuit board.

17. A monocular night vision device comprising:
   an objective lens assembly for receiving low intensity light;
   an image intensifier assembly comprising a variable gain image intensifier tube having an adjustable potentiometer externally mounted to a connection device via a flexible circuit and operable for converting the low intensity light into a visible output image;
   a single eyepiece lens assembly for viewing said output image from said image intensifier assembly; and
   a non-metallic housing comprising:
      an upper housing containing the objective lens assembly, image intensifier assembly, and eyepiece lens assembly,
      a lower housing separated from said upper housing along the optical axis and containing an electronic circuit board and battery cavity for receiving two batteries, and
      fastening means for joining said upper and lower housings to one another, wherein said upper housing operates to optically align said objective lens assembly with said image intensifier assembly and said eyepiece lens assembly along the optical axis;
   a rotary switch coupled to the rear of said lower housing and to said circuit board for activating and deactivating said device;

an infra red (IR) illumination device and phototransistor mounted on said circuit board within a protective housing on the front of said lower housing, said IR illumination device responsive to said rotary switch for providing forward projection illumination, and said phototransistor operative to provide a signal to a sensor circuit indicative of the amount of sunlight detected, wherein said sensor circuit operates to turn off said device in response to said signal exceeding a predetermined threshold.

18. The device according to claim 17, further comprising:

a first indicator light emitting device (LED) mounted on said circuit board and responsive to said IR illumination device for providing a light signal to said user indicating activation of said IR device;

a second indicator light emitting device mounted on said circuit board adjacent said first indicator LED, said second indicator LED responsive to a sensor circuit for sensing when battery power drops below a threshold level and providing a second light signal to said user indicating said low battery condition.

19. The device according to claim 18, wherein said first and second indicators are located outside the optical field of view, said device further comprising a light transmitting ring coupled between said image intensifier tube and said eyepiece lens assembly on said upper housing, said light transmitting ring having first and second inwardly extending projections for receiving light illuminated from said first and second light emitting indicators disposed beneath said respective projections and transmitting said light into said user's field of view.

20. The device according to claim 19, further comprising:

a mounting socket coupled to said upper housing for attaching to a peripheral unit, said peripheral unit selected from the group consisting of a user's head, helmet, or weapon; and two contacts coupled to said upper housing and adjacent said mounting socket, said contacts operative to provide electrical connection between said peripheral unit and said device.

* * * * *